United States Patent [19]
Grzybowski

[11] Patent Number: 5,340,391
[45] Date of Patent: Aug. 23, 1994

[54] PERFORMANCE-MODIFIED COLD-APPLIED ASPHALT COMPOSITIONS

[75] Inventor: Ken F. Grzybowski, Temple Terrace, Fla.

[73] Assignee: ReClaim, Inc., Tampa, Fla.

[21] Appl. No.: 29,764

[22] Filed: Mar. 11, 1993

[51] Int. Cl.⁵ .............................................. C08L 95/00
[52] U.S. Cl. ................... 106/281.1; 106/277; 106/278; 106/282; 521/40
[58] Field of Search ............. 106/277, 278, 281.1, 106/282; 521/40

[56] References Cited

U.S. PATENT DOCUMENTS

| | | | |
|---|---|---|---|
| 4,147,436 | 4/1979 | Garbelman et al. | 106/281.1 |
| 4,177,080 | 12/1979 | Mendenhall | 106/281.1 |
| 4,256,506 | 3/1981 | Mendenhall | 106/281.1 |
| 4,325,641 | 4/1982 | Babus et al. | 366/18 |
| 4,330,340 | 5/1982 | Carlton | 106/281.1 |
| 4,359,381 | 11/1982 | Jinno | 106/281.1 |
| 4,373,961 | 2/1983 | Stone | 106/281.1 |
| 4,481,039 | 11/1984 | Mendenhall | 106/281.1 |
| 4,540,287 | 9/1985 | Servas et al. | 366/7 |
| 4,549,834 | 10/1985 | Allen | 404/75 |
| 4,706,893 | 11/1987 | Brock | 241/23 |
| 4,726,846 | 2/1988 | Jackson | 106/281 R |
| 4,738,723 | 4/1988 | Frizzell et al. | 106/202 |
| 4,759,799 | 7/1988 | Vicenzi | 106/278 |
| 4,868,999 | 9/1989 | Radomsky | 34/127 |
| 4,921,730 | 5/1990 | Sasaki | 427/138 |
| 5,004,772 | 4/1991 | Grzybowski et al. | 524/62 |

FOREIGN PATENT DOCUMENTS

| | | | |
|---|---|---|---|
| 0116816 | 8/1984 | European Pat. Off. | 106/277 |
| 2656117 | 6/1977 | Fed. Rep. of Germany | 106/281.1 |
| 52-074616 | 6/1977 | Japan | 106/277 |
| 92/015645 | 9/1992 | World Int. Prop. O. | 106/282 |

*Primary Examiner*—Anthony Green
*Attorney, Agent, or Firm*—Jansson & Shupe, Ltd.

[57] ABSTRACT

Improved cold-applied asphalt compositions for use as sealants, cements, coatings and the like, including recycled asphalt roofing wastes, and asphalt. Recycled roofing wastes provide an excellent, although unexpected, source of temperature-stable asphalt, stabilizing filler, and reinforcing fiber, which provides compositions having exceptional performance characteristics as well as the reduction or elimination of asbestos from such compositions. Use of asphalt roofing wastes allows for recycling of a non-renewable resource and provides an environmentally-safe alternative to landfill disposal of such materials.

16 Claims, No Drawings

PERFORMANCE-MODIFIED COLD-APPLIED ASPHALT COMPOSITIONS

FIELD OF THE INVENTION

This invention is related generally to asphalt-based sealants, and cements and, more particularly, to those compositions which are cold-applied.

BACKGROUND OF THE INVENTION

Cold-applied asphalt compositions have demonstrated wide utility as sealants, cements, and a variety of coating materials. Compositions of this sort are characterized by the presence of an asphalt base, either neat, "cut-back" by a suitable solvent, or emulsified in water. The primary objective is to provide a product which meets specific performance standards and may be used without an external source of heat over a wide range of weather and application conditions.

With respect to this last requirement, an assortment of additional ingredients may be incorporated into the asphalt to achieve and/or improve performance characteristics. Fibers (synthetic and otherwise), fillers, pigments, and various miscellaneous chemical additives such as dispersants and surfactants may be included. These compositions may be further modified through selection of an asphalt base having a particular viscosity, softening point, and penetration. The asphalt cures after application, leaving a product designed and formulated to perform a specific function.

For many years asbestos has been used to impart texture, strength, and thixotropic properties to asphalt compositions. However, because indications are that asbestos is both toxic and carcinogenic many such products have fallen out of favor, especially so where comparable filler and/or fiber substitutes are available.

The search for improved cold-applied asphalt compositions where the asbestos used may be minimized or replaced entirely without a decrease in performance has been an on-going concern in the art. Asbestos may be replaced by a gelling clay, either alone or with a surfactant, to gel and thicken the asphalt. Other approaches utilize cellulose or synthetic fibers to prevent component separation within the asphalt composition and provide other desirable structural and physical characteristics.

However, the prior art has associated with it a number of significant problems and deficiencies. Most are related to inefficient formulation procedures and inadequate compositional performance, and result from the asphalt, filler, and fiber components currently used.

Where asbestos is avoided, one major problem of the prior art is sufficient dispersion of a suitable fiber substitute. Those fibers used tend to agglomerated as a result of manufacturing and packaging processes. An aqueous surfactant or an acrylic latex emulsion is often needed to disperse the fibers and promote a homogeneous product. Alternatively, special equipment is often required to de-lump or shred the fibers prior to addition. Once incorporated, the fibers tend to float, remain agglomerated, and/or resist wetting-out and dispersion. Some fibers, such as the cellulosics, once added, require additional time to reach an absorptive equilibrium with the host asphalt composition. Pre-soaking cellulose fibers in water or a surfactant has been suggested, but has achieved little practical utility. Likewise, high-speed and/or prolonged mixing may improve product consistency, but are often impractical. As a result, factors such as these adversely effect product formulation, necessitating adjustments to asphalt concentration and other composition components.

Likewise, with or without asbestos, if mineral fillers are used to impart certain physical properties to the asphalt composition, care must be taken to avoid uneven blending which may lead to a non-homogeneous product and subsequent performance deficiencies. For example, asphalt adheres very poorly to unwetted, dry filler particles. Poor adhesion later manifests itself in structural flaws and eventual composition failure.

Another significant concern relates to the asphalt currently used. Whether present neat, as a cutback, or in an emulsified form, a "harder" asphalt is desirable for its thixotropic and thermal resistance properties. However, softer asphalts are often favored for reasons relating to cost and formulation. The harder asphalts typically require higher operating temperatures, which may present a significant problem with respect to emulsion compositions where temperatures below 190° F. are required to minimize water vaporization and prevent agglomeration. As a result, if harder asphalts are used, a chiller/cooler apparatus is required on the discharge port of the emulsion mill.

A concurrent problem relates to the accumulation of asphalt roofing wastes, the magnitude of which may be illustrated by just one component thereof - roofing shingles. According to a recent estimate, approximately 92 million squares of roofing shingles, each weighing between 200–250 pounds, are produced annually in the United States. Significant waste accompanies shingle manufacture and is estimated to total nearly 100,000 tons of shingle cut-outs/trimmings, corresponding to about 25,000 tons of asphalt. Similar quantities of broken and defective shingles and/or asphalt are also discarded. In addition, the annual removal of previously-applied shingles accounts for approximately 32 million tons of asphalt.

These figures are nearly matched by the amounts of waste generated from other types of asphalt roofing materials, such as asphalt-saturated organic felts, asphalt-impregnated glass and polyester mats, rolled roofing products such as ply sheets, modified bitumen membranes and the like, as well as commercial built-up roofs. (For the purpose of this discussion, the term "asphalt roofing wastes" will refer to waste generated through the manufacture and/or disposal of these and related materials.)

For many years, asphalt roofing wastes have been land-filled. What once seemed to be a sound "solution" has spawned a multitude of more worrisome concerns, foremost among which is the creation of permanent, non-reclaimable landfills. Furthermore, with an increasingly larger population and ever-growing volume of solid wastes, the number of available landfills has dwindled to the point where most states now ban certain types of refuse. As such, it is no longer environmentally-wise or economically-feasible to continue landfill disposal of asphalt roofing wastes.

OBJECTS OF THE INVENTION

It is an object of this invention to provide cold-applied asphalt coatings, sealants, and cements and the like, including cutback and emulsion compositions, overcoming some of the problems and shortcomings of the prior art.

Another object of this invention is to provide an improved asphalt composition which, if asbestos is required, minimizes the quantity used without a decrease in performance.

Another object of this invention is to provide an improved asbestos or asbestos-free asphalt composition where an asphalt-impregnated, performance-enhancing fiber component may be incorporated therein efficiently and homogeneously without resorting to exhaustive pre-soaking or mixing procedures, such that further formulation adjustment is minimized.

Another object of this invention is to provide a singular, economical source of hard, temperature-stable asphalt, mix-stabilizing filler and re-enforcing fiber for use in asphalt sealant, cutback, and emulsion compositions.

These and other important objects will become apparent from the descriptions of this invention which follow.

SUMMARY OF THE INVENTION

This invention entails improved cold-applied asphalt compositions for use as sealants, cements, coatings and the like. It overcomes certain well-known problems and deficiencies, including those outlined above, while simultaneously decreasing waste disposal and petroleum consumption. An important aspect of this invention is the use of recycled asphalt roofing waste, not merely as an asphalt substitute, but to improve the performance of cold-applied asphalt compositions through introduction of beneficial filler and fiber.

In part, this invention is a cold-applied asphalt composition of the type which contains asbestos, the improvement including (1) about 20.0–90.0 parts by weight asphalt; and (2) about 0.10–30.0 parts by weight recycled asphalt roofing waste. The waste is a predominant source of temperature-stable asphalt, stabilizing filler, and reinforcing fiber. (The term "predominant", as used herein and in conjunction with the asphalt, filler, and fiber derived from recycled asphalt roofing waste, refers to the unique controlling influence it exerts upon a composition at any level of incorporation, in terms of physical characteristics and performance.)

In preferred embodiments of this type, the asphalt is present as an asphalt cutback having (1) about 50–85 parts by weight asphalt, and (2) about 15–50 parts by weight solvent. Preferably, the solvent is selected from the group consisting of petroleum distillates and mixtures thereof.

Likewise, in preferred embodiments of this type, the recycled asphalt roofing waste is size-graded to a dimension of about 0.04–0.60 mm, such that the fibrous form and quality of the fiber component thereof is maintained. In highly preferred embodiments, the waste is size-graded to a dimension of about 0.11–0.21 mm with like concern with respect to the fiber component. This invention may also include an additive such as a reflective pigments or a desiccant to impart additional physical characteristics to the composition.

In part, this invention is also a cold-applied asphalt composition of the asbestos-free type, the improvement including (1) about 20.0–90.0 parts by weight asphalt; (2) about 0.10–30.0 parts by weight filler; and (3) about 0.10–30.0 parts by weight recycled asphalt roofing waste as a predominant source of temperature-stable asphalt, stabilizing filler, and reinforcing fiber. The asphalt component thereof may be selected from the group consisting of neat asphalt, asphalt cutbacks, and aqueous asphaltic emulsions.

In preferred embodiments of this type, the recycled asphalt roofing waste is size-graded to a dimension of about 0.04–0.60 mm, such that the fibrous form and quality of the fiber component thereof is maintained. In highly preferred embodiments, the waste is size-graded to a dimension of about 0.11–0.21 mm with like concern with respect to the fiber component. Likewise, in preferred embodiments, the filler includes an emulsifying clay, and may further incorporate a surfactant. The composition may also include additives such as pigments, desiccants, biocides, and the like.

As previously noted, the compositions described herein are distinguishable in that recycled asphalt roofing waste is used, not merely as an asphalt substitute, but to modify and improve the physical properties and performance of the resulting cold-applied products. For example, high-temperature flow properties and resistance to fatigue and/or thermal cracking are improved. Product consistency is also increased. Wear resistance, if applicable, is enhanced, as is overall weatherability.

Conventional asphaltic compositions may incorporate fiber and filler, but only with added time and expense. The inventive recycled waste allows for simultaneous introduction of a temperature-stable asphalt, performance-enhancing fiber and mix-stabilizing filler, which act synergistically to improve composition performance over a wide range of temperatures and applications. The availability of three key ingredients from a common source promotes efficiency and economy in formulation and production.

The asphalt component of the recycled waste described herein is distinct from asphalt present in conventional cutbacks, emulsions, or sealing compounds. The unique temperature stability exhibited is acquired during the manufacturing process, where the asphalt is heated to temperatures approaching 500° F. and treated with dry air to compositionally alter the asphalt. The viscous, low-penetration material produced is especially suitable for inclusion in the compositions of this invention.

The asphaltic waste, which includes filler and fiber, is processed as a finely-graded particulate. As such, it does not agglomerate at ambient processing temperatures. Pre-addition liquification is unnecessary and serves to further distinguish this invention from the prior art. The practical advantage is that a harder asphalt may be incorporated into either a sealing emulsion, or cutback composition homogeneously, without additional, costly pre-processing procedures. The benefits are especially obvious in emulsion technology where addition of a heated, hard asphalt would otherwise induce thermal shock—breaking the emulsion and/or creating localized water evaporation—and inevitably lead to performance failure.

As with emulsions, the recycled asphalt roofing waste described herein may be used with neat asphalt, or asphalt cutbacks. When used with the former, such as in a cold-applied joint sealing composition, the waste material is simply blended into a heated petroleum asphalt. The asphalt base may be chosen specifically for particular physical characteristics. However, any asphalt so used is generally less viscous than otherwise possible because the hard asphalt component of recycled waste more than compensates therefor while improving performance. Depending upon geographical location and local manufacturing capacities, a less viscous asphalt may also be less expensive, such that use of the inventive waste affords an additional cost savings.

Because a source of hard, temperature-stable asphalt provides a composition with enhanced viscosity, the applied end product is less susceptible to asphalt separation from the filler and fiber components and more resistant to cracking and flow deformation. Higher viscosities also ensure mix uniformity during processing packaging, and application, without adversely altering the shear-susceptibility of the applied composition.

As noted above, the recycled asphalt waste is also a single source of fiber and filler, and provides both process and performance advantages not currently available. The exact nature of the fiber component depends on the source of the roofing waste. Generally, however, fibers are predominantly cellulose; fiberglass and various synthetic fibers such as polyester may also be present in lesser amounts. Through the original manufacturing and subsequent recycling processes, the fibers are pre-dispersed and impregnated with asphalt, rendering lengthy pre-addition, pre-soaking, or mix procedures unnecessary. Absorptive equilibrium with the asphalt component is obtained before introduction to the composition. As a result, homogeneous products may be formulated with minimal adjustment or change in performance.

The filler component of the recycled material is also dependent upon the particular waste utilized and may include limestone, sand and/or other such particulates. As with the fiber, the filler is effectively pre-dispersed and pre-coated with asphalt. Homogeneity may be achieved upon addition, with minimal mixing, and the resulting composition is more impermeable to moisture and air which would otherwise adversely affect performance and integrity.

Compositions incorporating recycled roofing waste perform well over a wide range of weather conditions. In cold temperatures, over a variety of substrates, and through repeated freeze-thaw cycles, the asphalt-coated filler and fiber prevent thermal cracking. The same components, at temperatures between 120°–160° F., also prevent the asphalt composition from flowing, sagging, and/or separating.

The inventive recycled asphalt roofing waste is available from ReClaim, Inc. of Tampa, Fla. under the Re-Acts IP trademark. A functionally-important aspect of this particular waste is that it is specifically dimensioned to meet a number of competing performance and process concerns, yet produce a wide variety of performance-enhanced compositions. Preferably, the waste is size-graded to a dimension of about 0.04–0.60 mm. A size gradation of about 0.11–0.21 mm is highly-preferred. (Dimensions are those corresponding to ASTM standard sieve designations.)

The dimension of the waste component is important to the physical qualities and performance of the compositions described herein. It must be dimensioned in such a way as to become fully integrated and homogeneously dispersed throughout an asphalt base with minimal mixing, whether the asphalt is neat, cutback, or emulsion-based. Gradations larger than those indicated tend to induce agglomeration and related process difficulties and provide non-homogeneous compositions which invariably fail to meet performance standards. In particular, large gradations present numerous problems when post-added to an emulsion composition. However, at gradations finer than those indicated the fiber characteristic of the waste begins to diminish. It is thought, the fiber component of the waste is critical to performance in that it acts with the asphalt and filler to reinforce the composition, making it more resistant to thermal cracking and phase separation.

The identity of the asphalt, filler, and fiber components of the roofing waste and their relative amounts may vary depending upon the specific roofing product and/or its manufacturer. Component homogeneity and specificity are essential to the production of uniform and reproducible compositions. It should be emphasized that the component portions of the recycled waste approximate the weighted average of all types of waste marketed and/or indigenous to a given locale. It is within this parameter that the roofing waste of this invention comprises about 5–15 weight percent fiber, about 40–70 weight percent filler, and about 30–40 weight percent petroleum asphalt.

The compositions of this invention may be prepared such that all filler and fiber may be derived solely from recycled roofing waste. However, in some instances, to achieve a specific physical characteristic, it may be advantageous to supplement those components through extraneous sources. Additional reinforcement and consistency may be provided through incorporation of mineral-type fibers such as wollasonite, or additional synthetic or cellulosic fibers. Similarly, additional filler may be added to improve viscosity and weatherability. To that effect, such compositions may also include limestone, silica sand, fly-ash, and the like. Sources of such filler and fiber are known to those made aware of this invention.

Likewise, specifications under which the asphaltic compositions are prepared may require use of pigments to provide an appearance other than the black color of the cured asphalt. For instance, leafing and non-leafing aluminums (as used in ASTM D 2824), provide a silvery reflective surface. Sources and grades of such additives are also well known to those skilled in the art.

Traditionally, only fiberglass-type roofing shingles have been considered for use in recycled products, and then only as an asphalt-substitute. Such products are designed in such a way as to offset the "undesirable" asphalt hardness and viscosity. Low-viscosity, high-penetration asphalts and/or oils are added to compensate therefor and meet specific performance standards. For this reason, the recycled roofing waste of this invention would not seem appropriate for use in the compositions described. It would seem improbable that the quantities disclosed herein could be utilized and still result in compositions with improved performance properties.

The use of recycled asphalt roofing waste in this manner and to the extent disclosed herein is contrary to the art. The enhanced physical and performance properties obtained were quite unexpected. Without advancing any one explanation, it appears the fine gradations employed and the synergistic effect of the filler and cellulosic fiber present permit the use of a more temperature-stable asphalt—and larger quantities of it—than otherwise possible. Additional asphalt, in turn, improves performance properties such as adhesion and resistance to oxidative aging.

The asphalt cutbacks usable with this invention may be of the medium-cure (MC), rapid-cure (RC), or slow-cure (SC) varieties, and the solvents are chosen largely to control the curing rate of the resulting compositions. Examples of cutbacks which may be used in conjunction with this invention are those purchased pre-blended from Exxon Corporation of Houston, Tex. and Trumbull Asphalt Company of Summitt, Ill., among other sources well-known to those skilled in the art. Alternatively, suitable cutbacks may be prepared from AC-10, AC-20, AC-30, AC-40 and related petroleum asphalts, or the equivalent AR grades, and commercially-available solvents such as Rule and Non-Rule 66 mineral spirits, kerosene/No. 2 fuel oil, and the like. Suppliers of such asphalts and distillates include the aforementioned Exxon Corporation and Trumbull Asphalt Company.

The choice/amount of asphalt base and amount of recycled roofing waste are interrelated. The inventive waste, with its temperature-stable asphalt, permits use of a softer asphalt base or, alternatively, one more easily cut-back or emulsified. Generally, such asphalts, whether neat or cut-back, are less costly. Also, with more roofing waste used, less asphalt base is required. A manufacturer is able to utilize lower amounts of locally-available and/or less expensive asphalts and significantly decrease overall production costs.

Where part of an asphaltic emulsion, the recycled waste material is typically blended into heated asphalt prior to emulsification. Precautions must be taken to ensure the fiber component does not thermally degrade and the filler does not settle. Once properly blended, the asphaltic mixture may be emulsified through normal procedures. Emulsions produced in this manner provide very temperature-stable and structurally-strong materials with excellent resistance to thermal cracking and separation. Adhesion and weathering properties are also improved.

Regardless of whether asphalt cutbacks or emulsions are used, asbestos-free compositions may also include a clay component. Suitable clays are well-known to those skilled in the art and include the attapulgite, bentonite, and ball varieties available from a number of sources, including Engelhard Corporation of Edison, N.J. Such clays, whether or not used with a surfactant, provide non-asbestos compositions the desired physical and performance characteristics. (Of course, in those compositions not otherwise restricted, asbestos may be used to impart consistency and weatherability. The addition of recycled roofing waste enhances these characteristics with a corresponding decrease in the amount of asbestos needed.)

The criteria used to evaluate the compositions described herein, as well as the procedures for determining the various performance properties discussed, are well-known. Reference is made to the American Society for Testing and Materials (ASTM) standard test procedures and product specifications, the Canadian Government Standards Bureaus (CGSB) test procedures and product specifications, as well as other authorities, including the American Association of State Highway and Transportation Officials (AASHTO)—particularly so for test procedures and specifications relating to asphalt emulsion products.

In addition to perhaps more obvious benefits, this invention provides several environmental benefits. Whereas production of asphaltic materials represents a significant consumption of petroleum reserves. Recycling what would otherwise be considered garbage conserves a non-renewable resource. Moreover, the energy and costs required to produce the asphalt is also saved. Repeated conflicts with major oil-producing countries and record budget deficits here at home underscore the potential impact of this invention.

Preparation of the Compositions

A number of factors must be considered when preparing compositions in accordance with this invention. Among these are the relative amounts of neat asphalts cutbacks or emulsion, the type of asphalt cutback/emulsion, the use of asbestos or clay-gel structures, the nature of the processing equipment available, the type of fiber and filler and order of addition, and mixing times.

While processing steps are not critical and considerable variation is possible, certain blending procedures tend to maximize the benefits available. The procedures are dependant upon the presence of asbestos, the cutback/emulsion used, and the blending and/or emulsifying equipment available. In standard asbestos-containing cutback formulations, the preferred procedure is to add the recycled roofing waste immediately after the solvent, to achieve optimal dissolution and dispersion of the asphalt component. With corresponding non-asbestos formulations, where the asphalt cutback is not pre-prepared, it is preferable to add the roofing waste after the clay-gel structure has been effected. Addition prior to gelling is possible, though not recommended.

While not common, the recycled roofing waste may also be pre-dissolved in either the asphalt or solvent portion of a cutback prior to blending. When either addition sequence is employed, several special precautions must be taken. Vessels must be agitated to ensure particulate materials do not settle. If the waste is added directly to the asphalt portion, temperatures above 350° F. must be avoided to prevent thermal decomposition of cellulosic fiber. If the waste material is added to the solvent portion of the cutback, special attention must be paid to maintain agitation and prevent separation of the filler and fiber components. As mentioned above, the end-use application and/or processing equipment available will often establish procedure parameters.

In the situation involving emulsified compositions, the waste material is typically added to the completed emulsion, but prior to the addition of other ingredients. Alternatively, the waste may be added directly to the asphalt before emulsification. However, with the later procedure, numerous evaluations and trials may be required regarding the type of emulsifier and/or clay needed to ensure emulsion stability.

It is acknowledged that the procedures discussed herein may be modified as necessary in order to prepare a composition with specific physical and performance properties. It is beyond the scope of this discussion to detail the numerous instruments and methods for evaluating composition properties. Reference is simply made to published ASTM, CGSB, and AASHTO recommendations, as well as those of other qualified agencies.

EXAMPLES OF THE INVENTION

The following illustrate use of recycled asphalt roofing waste (RARW) in asphalt cutback, emulsion, and compositions. The components are as indicated, in terms of parts by weight of the total composition.

By way of further explanation, Cutback A is a standard industry designation for a cutback comprising AC-20 asphalt (70–72 weight percent), and NON-RULE 66 mineral spirits (28–30 weight percent), having a viscosity of 15–25 stormer seconds (propeller plus 100 gms).

Likewise, Cutback B comprises type III asphalt (62–65 weight percent), and NON-RULE 66 mineral spirits (35–38 weight percent), having a viscosity of 25–30 stormer seconds (propeller plus 100gms).

Also, as designated by the industry, SS-1h emulsion comprises AC-20 asphalt (63–67 weight percent), water (33–37 weight percent), and anionic emulsifying agents (0.4–0.7 weight percent), in accordance with ASTM D 977 standard specifications.

EXAMPLE 1

| Asphalt Cutback - A | 85.5 parts |
|---|---|
| RARW | 2.0 parts |
| Asbestos Fiber | 12.5 parts |

This example is a brushable asbestos-containing roof coating, meeting ASTM D 2823 standard specifications. It exhibited a consistency equivalent to a composition containing approximately 40% more asbestos.

EXAMPLE 2

| Asphalt Cutback - A | 70.0 parts |
|---|---|
| RARW | 20.0 parts |
| Asbestos Fiber | 10.0 parts |

This composition meets ASTM D 2822 standard specifications although, as in example 1, the level of asbestos fiber is significantly reduced. Furthermore, a separate filler component has been eliminated altogether, without change in ASTM D 2822 properties. Weathering was enhanced after 500 QUV hours, as compared to a similar composition containing a separate filler and normal asbestos fiber levels. This example is representative of the manner in which formulation costs may be reduced significantly.

EXAMPLE 3

| Asphalt Cutback - B | 55.0 parts |
|---|---|
| RARW | 5.0 parts |
| Mineral Spirits | 23.0 parts |
| Leafing Grade Aluminum Paste | 15.0 parts |
| Desiccant | 1.0 part |
| Asbestos Fiber | 1.0 part |

This example shows use of recycled asphalt roofing waste in an asbestos-fibered aluminum roof coating, which exhibits properties in accordance with ASTM D 2824, Type III. Asbestos levels have been reduced seven-fold and other fillers eliminated, altogether, without a sacrifice in performance. It was observed that reflectances improved upon accelerated aging.

EXAMPLE 4

| Asphalt Cutback - A | 72.0 parts |
|---|---|
| Surfactant | 0.7 parts |
| Clay | 6.0 parts |
| RARW | 11.8 parts |
| Cellulose Fiber | 3.0 parts |
| Limestone | 6.5 parts |

This example demonstrates use of recycled asphalt roofing waste in an asbestos-free roofing cement, having a trowelable consistency in accordance with ASTM D 4586 standard specifications. The levels of clay, surfactant, cellulose, and limestone were reduced, over those typically present in a comparable composition, without a decrease in performance. This formulation also exhibited excellent weathering without cracking or separation after 1,000 QUV hours. The surfactant employed was that available under the tradename PA-14 Acetate, from Exxon Chemical Company. The clay was an attapulgite, available under the Attagel 36 tradename from Englehard Corporation.

EXAMPLE 5

| Asphalt Cutback - A | 90.0 parts |
|---|---|
| Surfactant, PA-14 Acetate | 0.2 parts |
| Clay, Attagel 36 | 2.0 parts |
| RARW | 7.8 parts |

The composition of this example is an asbestos-free roof coating with a brushable consistency, meeting the criteria of ASTM D 4479. The combined clay/surfactant ingredients were reduced from 6.0 parts through incorporation of recycled asphalt roofing waste. Additional cellulose fiber was eliminated completely, as was a limestone filler. Again, this example illustrates a significant reduction in formulation and raw material costs.

EXAMPLE 6

| Mineral Spirits | 22.0 parts |
|---|---|
| Leafing Grade Aluminum Paste | 15.0 parts |
| Asphalt Cutback - A | 50.0 parts |
| RARW | 10.0 parts |
| Desiccant | 0.6 parts |
| Limestone | 2.4 parts |

This example shows an asbestos-free fibered aluminum roof coating. The formula substitutes RARW for cellulose fiber and nearly all of the filler component. Normally, high-softening point/high-viscosity asphalts are used to ensure weathering properties. However, hard asphalt component of the waste allows use of a low-softening point/low viscosity asphalt in the cutback. This substitution enhances stirback properties after shelf-life aging. This formulation met all requirements of ASTM D 2824, Type III, and exhibits improved reflectance and weathering properties after accelerated aging, as compared to a similar composition without recycled asphalt roofing waste.

EXAMPLE 7

| Asphalt Cutback - B | 88.0 parts |
|---|---|
| Surfactant, PA-14 Acetate | 0.6 parts |
| Clay | 4.8 parts |
| RARW | 4.6 parts |
| Cellulose | 2.0 parts |

This asbestos-free fibered lap cement exhibited a 25% improvement in lap-bond strengths, as compared to a similar formulation without recycled asphalt roofing waste. This composition met all standard specifications under ASTM S 3019, Type III.

EXAMPLE 8

| Asphalt Emulsion-SS-1h | 68.8 parts |
|---|---|
| Water | 16.2 parts |
| RARW | 11.8 parts |
| Clay, Ball Type | 2.8 parts |
| Biocides | 0.4 parts |

This composition is a non-specification controlled crack filler, formulated to be poured easily. The composition exhibited excellent cured properties, including reduced shrinkage and cracking upon water evaporation. Most importantly, the composition cured to a soft, but not tacky, condition, which reduced the tendency to track.

EXAMPLE 9

| Asphalt Emulsion-SS-1h | 51.3 parts |
|---|---|
| RARW | 28.3 parts |
| Filler, Silica Sand | 20.0 parts |

EXAMPLE 9-continued

| | |
|---|---|
| Biocide | 0.4 parts |

This example shows a non-specification controlled pavement patching material with trowelable consistency and superior cured properties. Shrinkage and cracking were reduced, over a comparable composition without recycled asphalt roofing waste. The patch exhibited greater resistance to deformation at warm temperatures and was less susceptible to tracking.

EXAMPLE 10

| First, emulsify: | |
|---|---|
| Asphalt, AC-30 | 48.0 parts |
| RARW | 12.0 parts |
| Surfactant | 2.4 parts |
| Water | 37.6 parts |
| Second: | |
| The above emulsion | 74.0 parts |
| Anionic Latex | 2.8 parts |
| Filler, Silica Sand | 23.2 parts |

This formulation was designed to mimic the pavement sealer performance properties of coal tar emulsions and meet Federal Specification R-P-355e. It exhibited viscosities of 4,000–6,000 cps, and cured to a hard, water-resistant film, and wear resistance properties were equivalent to similar coal tar compositions. Through use of recycled asphalt roofing waste, this formulation represents a low-cost substitute for an equivalent coal tar emulsion product.

EXAMPLE 11

| | |
|---|---|
| Example 5 | 99.4 parts |
| Wet Surface Adhesion Additive | 0.6 parts |

This composition illustrates incorporation of a wet surface adhesion agent, with recycled asphalt roofing waste, to provide an asbestos-free roofing cement for adhesion to damp, wet, or underwater surfaces, consistent with ASTM D 3409.

EXAMPLE 12

| | |
|---|---|
| Asphalt, AC-10 | 57.4 parts |
| RARW | 21.4 parts |
| Filler, Ball Clay | 18.8 parts |
| Cellulose | 2.4 parts |

This formulation provides a composition in compliance with Federal Specification SS-S-210, (sealing compound, preformed plastic) for expansion and pipe joints. Absent solvent., this composition is predated at 340°–360° F., but is cold-applied in a manner similar to a pre-formed chalk. The recycled asphalt roofing waste was incorporated into the formulation through simple mixing. Incorporation thereof allowed this formulation to meet all specification criteria in a very economical manner.

While the principles of this invention have been described in connection with specific embodiments, it should be understood clearly that these descriptions are made only by way of example and are not intended to limit the scope of the invention. For example, the asphaltic emulsions discussed herein are of the type such that clay and asphalt comprise the minor or discontinuous phase. However, compositions of this invention may be those wherein water is the minor or discontinuous phase, the so-called "inverted emulsions". Cutback emulsions are also considered as part of this invention; that is to say, wherein the asphalt is a slurry formed with a suitable solvent, which is then emulsified in water. Likewise, cutback emulsions may also be inverted.

What is claimed:

1. In a cold-applied composition including asphalt and asbestos, the improvement wherein:
   the amount of asphalt in the composition is about 20.0–90.0 parts by weight;
   and the composition further includes:
   about 0.10–30.0 parts by weight recycled asphalt roofing waste, said waste including temperature-stable asphalt, stabilizing filler, and reinforcing fiber.

2. The composition of claim 1 wherein the asphalt is an asphalt cutback, said cutback comprising:
   about 50–85 parts by weight asphalt; and
   about 15–50 parts by weight solvent.

3. The composition of claim 2 wherein the solvent comprises at least one petroleum distillate.

4. The composition of claim 1 wherein the recycled asphalt roofing waste is size-graded to a dimension of about 0.04–0.60 mm.

5. The composition of claim 4 wherein the recycled asphalt roofing waste is size-graded to a dimension of about 0.11–0.21 mm.

6. The composition of claim 5 wherein the asphalt is an asphalt cutback, said cutback comprising:
   about 50–85 parts by weight asphalt; and
   about 15–50 parts by weight solvent.

7. The composition of claim 6 wherein the solvent comprises at least one petroleum distillate.

8. The composition of claim 1 further comprising at least one additive selected from the group consisting of reflective pigments and desiccants.

9. In a cold-applied asbestos-free composition including asphalt, the improvement wherein:
   the amount of asphalt in the composition is about 20.0–90.0 parts by weight;
   and the composition further includes:
   about 0.10–30.0 parts by weight filler; and
   about 0.10–30.0 parts by weight recycled asphalt roofing waste, said waste including temperature-stable asphalt, stabilizing filler, and reinforcing fiber.

10. The composition of claim 9 wherein the asphalt is selected from the group consisting of neat asphalt, asphalt cutbacks, and aqueous asphaltic emulsions.

11. The composition of claim 9 wherein the recycled asphalt roofing waste is size-graded to a dimension of about 0.04–0.60 mm.

12. The composition of claim 11 wherein the recycled asphalt roofing waste is size-graded to a dimension of about 0.04–0.60 mm.

13. The composition of claim 12 wherein the asphalt is selected from the group consisting of neat asphalt, asphalt cutbacks, and asphaltic emulsions.

14. The composition of claim 9 wherein the filler is emulsifying clay.

15. The composition of claim 14 further comprising a surfactant.

16. The composition of claim 9 further comprising an additive selected from the group consisting of pigments, desiccants, biocides, and surface-adhesion agents.

* * * * *